(12) United States Patent
Orr

(10) Patent No.: US 7,579,814 B2
(45) Date of Patent: Aug. 25, 2009

(54) POWER CONVERTER WITH SNUBBER

(75) Inventor: Raymond Orr, Kanata (CA)

(73) Assignee: Potentia Semiconductor Corporation, Kanata, Ontario (CA)

( * ) Notice: Subject to any disclaimer, the term of this patent is extended or adjusted under 35 U.S.C. 154(b) by 0 days.

(21) Appl. No.: 11/652,613

(22) Filed: Jan. 12, 2007

(65) Prior Publication Data

US 2008/0169792 A1 Jul. 17, 2008

(51) Int. Cl.
G05F 1/24 (2006.01)
G05F 1/253 (2006.01)
G05F 1/00 (2006.01)
G05F 1/613 (2006.01)

(52) U.S. Cl. ............... 323/259; 323/225; 323/262; 323/290

(58) Field of Classification Search ............ 323/225, 323/232, 229, 222, 209, 259, 290, 344, 262
See application file for complete search history.

(56) References Cited

U.S. PATENT DOCUMENTS

| | | |
|---|---|---|
| 5,446,366 A | 8/1995 | Bassett et al. |
| 5,550,458 A | 8/1996 | Farrington et al. |
| 5,633,579 A | 5/1997 | Kim |
| 5,642,267 A * | 6/1997 | Brkovic et al. ............ 363/16 |
| 5,736,842 A | 4/1998 | Jovanovic |
| 5,909,107 A * | 6/1999 | Aonuma et al. ............ 323/222 |
| 5,943,200 A | 8/1999 | He |
| 5,969,515 A * | 10/1999 | Oglesbee ................. 323/283 |
| 6,051,961 A | 4/2000 | Jang et al. |
| 6,259,235 B1 * | 7/2001 | Fraidlin et al. ............ 323/222 |
| 7,233,507 B2 * | 6/2007 | Schenk ..................... 363/50 |
| 2004/0113596 A1 * | 6/2004 | Peron ....................... 323/282 |
| 2005/0135123 A1 | 6/2005 | Yuan et al. |

OTHER PUBLICATIONS

International Search Report for International PCT Application No. PCT/CA2008/000054, Published on Jul. 17, 2008.
International Written Opinion of the International Searching Authority for International PCT Application No. PCT/CA2008/000054, Published on Jul. 17, 2008.

* cited by examiner

*Primary Examiner*—Jessica Han
*Assistant Examiner*—Emily Pham

(57) ABSTRACT

A buck or boost converter, which includes a first inductor, a controlled switch, a main diode, and an output capacitor, also includes a snubber circuit to reduce losses. The snubber circuit includes a second inductor in a path in series with the switch and main diode of the converter, a series-connected resistor and diode connected directly in parallel with the second inductor, and a capacitance in parallel with the main diode and which can be constituted partly or entirely by parasitic capacitance of the main diode.

14 Claims, 4 Drawing Sheets

POWER CONVERTER WITH SNUBBER

This invention relates to power converters, and is particularly concerned with a power converter in which losses are reduced by using a snubber circuit without requiring an additional switch.

BACKGROUND

In a conventional boost converter, an input voltage is coupled via an inductor to a switch, typically a MOSFET, and a diode and a capacitor in series are coupled in parallel with the switch, an output voltage of the converter being derived from the capacitor. In the absence of a transformer, the output voltage is greater than the input voltage. The switch is alternately opened and closed, typically at a high frequency and with a controlled duty cycle.

An increasingly important application of boost converters is for power factor correction (PFC) in so-called offline power supply arrangements for consumer electronics equipment. In such arrangements typically a rectified AC power supply is converted by a boost converter to a high output voltage to provide a near-unity power factor; the output voltage can be used directly or converted by one or more other power converters to one or more AC and/or DC voltages for use.

Operation of a boost converter in discontinuous current mode (DCM), in which the converter switch is turned on when the inductor current is zero, has the results that the peak current is twice the average current and the inductor current has large swings, requiring a relatively large core involving increased losses. With increasing converter power levels, for example for power levels greater than about 200 or 300 W as may be required for a boost converter for PFC, it is preferable to operate the boost converter in continuous conduction mode (CCM), in which the converter switch is turned on before the inductor current has fallen to zero. A boost converter operated in CCM has relatively smaller inductor current swings and peak current.

In consequence, the diode of the boost converter, referred to as the boost diode, is required to have a very fast reverse recovery, especially in view of the typical high output voltage of a boost converter used for PFC. For example, such a boost converter may typically be desired to operate with a peak input voltage up to about 360V, the output voltage may conveniently be selected to be about 380 to 400V. During the reverse recovery period, immediately after the converter switch is turned on so that the diode is reverse biased, after having been forward biased and conducting the non-zero inductor current, the diode is still conductive due to carriers in the diode junction region, and very large reverse currents can flow, substantially increasing the stress and power loss in the converter switch.

The diode of a boost converter used for PFC can be based on silicon carbide semiconductor technology, but such diodes may have a cost of the order of ten times that of silicon diodes. Even with a diode that does not exhibit reverse recovery behaviour, the converter switch is turned on and off with the full current of the inductor flowing, resulting in substantial switching losses.

In order to reduce these disadvantages, it is known to provide more complex arrangements of a boost converter incorporating an additional or auxiliary switch. Examples of such converters are described in Bassett et al. U.S. Pat. No. 5,446,366 issued Aug. 29, 1995 and entitled "Boost Converter Power Supply With Reduced Losses, Control Circuit And Method Therefor"; Jovanovic U.S. Pat. No. 5,736,842 issued Apr. 7, 1998 and entitled "Technique For Reducing Rectifier Reverse-Recovery-Related Losses In High-Voltage High Power Converters", and in Jang et al. U.S. Pat. No. 6,051,961 issued Apr. 18, 2000 and entitled "Soft-Switching cell For Reducing Switching Losses In Pulse-Width-Modulated Converters".

The additional complexities and additional switch of such known converters add to their cost, as well as to the complexity and cost of the control circuit which must be provided for controlling the switches of the boost converters.

It is also known from Farrington et al. U.S. Pat. No. 5,550,458 issued Aug. 27, 1996 and entitled "Low-Loss Snubber For A Power Factor Corrected Boost Converter" to provide a boost converter with a snubber to reduce diode reverse recovery and switching losses without providing the converter with an additional switch. In this converter a snubber inductor is connected in series with the boost diode, and a resistor in series with a snubber diode is connected in parallel with the series-connected boost diode and snubber inductor. This arrangement has the disadvantage of requiring a further diode connected to the junction between the boost diode and the snubber inductor to prevent ringing of the voltage across the boost diode when the switch is on, with a resulting current circulating through the snubber inductor, this further diode, and the converter switch. This reference also discloses a similar snubber arrangement applied to a buck converter.

Another boost converter with a snubber circuit, having the disadvantage of further complexity, is known from Kim U.S. Pat. No. 5,633,579 issued May 27, 1997 and entitled "Boost Converter Using An Energy Reproducing Snubber Circuit".

There remains a need to provide a power converter, such as a boost converter or a buck converter, with reduced switching and/or reverse recovery losses using a relatively simple arrangement without an additional switch.

SUMMARY OF THE INVENTION

According to one aspect of this invention there is provided a power converter comprising two input terminals, two output terminals, an output capacitor coupled between the two output terminals, a first inductor in a series path between the input and output terminals, a switch controlled by a control signal, and a diode, the converter having a configuration for producing an output voltage at the output terminals from an input voltage supplied to the input terminals, the converter further comprising a second inductor, and a series-connected resistor and second diode in parallel with the second inductor, in a path in series with the switch and the first diode.

The first inductor and the switch can be coupled in series between the two input terminals, with the first diode in said series path between the input and output terminals, to provide a boost configuration of the power converter. In this case the second inductor can be in series with the first diode in said series path between the input and output terminals, or it can be in series with the switch in a shunt path of the converter.

Alternatively, the first inductor and the first diode can be coupled in series between the two output terminals, with the switch in said series path between the input and output terminals, to provide a buck configuration of the power converter. In this case the second inductor can be in series with the switch in said series path between the input and output terminals, or it can be in series with the diode in a shunt path of the converter.

A boost converter provided by another aspect of the invention comprises two input terminals, a first inductor and a controlled switch coupled in series between the two input terminals, a first diode and an output capacitor coupled in series across the switch, and a second inductor and a series-connected resistor and second diode in parallel with the second inductor, the second inductor and series-connected resistor and second diode in parallel therewith being in series with the first diode.

A boost converter provided by a further aspect of the invention comprises two input terminals, a first inductor and a controlled switch coupled in series between the two input terminals, a first diode and an output capacitor coupled in series across the switch, and a second inductor and a series-connected resistor and second diode in parallel with the second inductor, the second inductor and series-connected resistor and second diode in parallel therewith being in series with the switch.

A buck converter provided by another aspect of the invention comprises two input terminals, a controlled switch and a first diode coupled in series between the two input terminals, a first inductor and an output capacitor coupled in series across the first diode, and a second inductor and a series-connected resistor and second diode in parallel with the second inductor, the second inductor and series-connected resistor and second diode in parallel therewith being in series with the switch.

A buck converter provided by a further aspect of the invention comprises two input terminals, a controlled switch and a first diode coupled in series between the two input terminals, a first inductor and an output capacitor coupled in series across the first diode, and a second inductor and a series-connected resistor and second diode in parallel with the second inductor, the second inductor and series-connected resistor and second diode in parallel therewith being in series with the diode.

Operation of each of the above converters benefits from a capacitance in parallel with the first diode. A parasitic capacitance of the diode can conceivably constitute all of this capacitance in some cases, but preferably a capacitor is connected in parallel with the first diode. Another capacitor can also be coupled in parallel with the resistor, or alternatively the capacitor can be connected in parallel with the first diode in series with the resistor or the second diode.

The invention also extends to a circuit arrangement comprising: a first inductor through which a current flows in operation of the circuit arrangement; a switch arranged to be opened and closed under the control of a control signal, the switch being arranged for conducting current of the first inductor when the switch is closed; and a first diode arranged to be forward biased for conducting current of the inductor when the switch is open and for being reverse biased when the switch is closed; wherein the circuit arrangement further comprises: a second inductor, having an inductance much less than an inductance of the first inductor; and a resistor and a second diode connected in series with the resistor, the series-connected resistor and second diode being connected in parallel with the second inductor; the second inductor with the series-connected resistor and second diode in parallel therewith being in a path in series with the switch and the first diode.

The circuit arrangement preferably includes a capacitor connected in parallel with the first diode. The circuit arrangement can form a boost converter having input and output terminals, the first inductor coupling the input terminals to the switch, and the first diode coupling a junction between the first inductor and the switch to the output terminals. Alternatively, the circuit arrangement can form a buck converter having input and output terminals, the first inductor coupling the output terminals to the first diode, and the switch coupling a junction between the first inductor and the first diode to the input terminals.

BRIEF DESCRIPTION OF THE DRAWINGS

The invention will be further understood from the following description by way of example with reference to the accompanying drawings, in which the same references are used in different figures to represent corresponding elements and in which.

DETAILED DESCRIPTION

Figure 1:
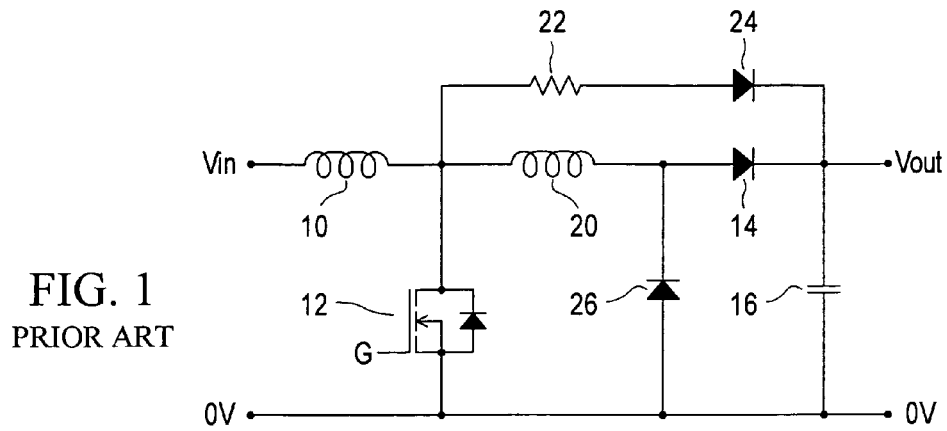
FIG. 1 schematically illustrates a known boost converter having a snubber circuit.

Referring to the drawings, FIG. 1 schematically illustrates a boost converter having a snubber circuit, which is known from U.S. Pat. No. 5,550,458 referred to above. The boost converter itself comprises an inductor 10, a switch 12, a diode 14, and a capacitor 16. A positive input voltage Vin from a suitable source (not shown), relative to a zero volt (0V) line is coupled via the inductor 10, referred to as a boost inductor, to the switch 12 which typically can be, and in FIG. 1 is shown as being, constituted by a MOSFET with its drain connected to the inductor 10, its source connected to the 0V line, and a gate to which a pulsed control signal G is applied in known manner for controlling the state of the switch 12. FIG. 1 also shows a so-called body diode inherent to the MOSFET, having its anode connected to the source and its cathode connected to the drain of the MOSFET.

The junction between the drain of the MOSFET switch 12 and the inductor 10 is coupled, in the case of FIG. 1 via an inductor 20 which forms part of the snubber circuit, to the anode of the diode 14, referred to as a boost diode or rectifier. The cathode of the diode 14 is connected to an output terminal of the converter for a positive output voltage Vout, relative to the 0V line, and to one terminal of the capacitor 16, referred to as an output capacitor, the other terminal of which is connected to the 0V line.

For example, the input voltage Vin can comprise a smoothed DC voltage or, particularly in the case of a boost converter used for PFC, a rectified AC voltage. By way of further example, for a boost converter to be used for PFC in consumer electronics equipment such as a television, the input voltage Vin may be a rectified AC voltage with a peak voltage in a range of the order of 120 to 360V, and the output voltage Vout may be of the order of 380 to 400V, for example about 385V. In such an application the converter may be designed for an output power in a range of, for example, 200 to 700 W, with the converter operated in continuous current mode (CCM).

As is well known in the art, when the switch 12 is open (the MOSFET is off or non-conductive), current from the input flows via the boost inductor 10 and the boost diode 14, which is forward biased, to charge the capacitor 16 and maintain its output voltage Vout while supplying current to a load (not shown) coupled to the output of the converter. When the switch 12 is closed by the control signal G (the MOSFET is turned on or conductive), while current is flowing in the inductor 10 in the case of CCM, the inductor current flows via the switch 12, the diode 14 is reverse biased, and current to the load is maintained by the output capacitor 16.

With such switching of the switch 12 the inductor current is switched by the MOSFET switch 12 being turned on and off, resulting in undesired switching losses. Although a high switching frequency is desirable to facilitate reducing sizes of the boost inductor 10 and the output capacitor 16, such switching losses increase with increasing switching frequency and hence impose a practical limit on the switching frequency.

In addition, in the absence of the snubber circuit described below, when the MOSFET switch 12 is turned on the boost diode 14 is reverse biased, but remains conductive during its reverse recovery period, resulting in large currents flowing during this period, increasing the stresses imposed on the switch 12 and increasing the converter losses.

The snubber circuit of the boost converter of FIG. 1 includes, in addition to the snubber inductor 20 in series with the boost diode 14, a series-connected snubber resistor 22 and diode 24 connected in parallel with the series-connected snubber inductor 20 and boost diode 14, and a further diode 26 having its anode connected to the 0V line and its cathode connected to the junction between the snubber inductor 20 and the boost diode 14.

The snubber inductor 20 slows the turn off of the boost diode 14 and hence reduces its reverse recovery losses, and reduces turn-on losses of the MOSFET switch 12 by preventing a rapid increase of current. The voltage across the MOSFET switch is prevented from ringing, when the switch is turned off, by the resistor 22 and diode 24 clamping this voltage to the output voltage Vout. The further diode 26 conducts negative current in the snubber inductor when the MOSFET switch 12 is turned on.

This known boost converter has the disadvantage of requiring the diode 26 to prevent ringing of the voltage at the junction between the snubber inductor 20 and the boost diode 14. A further disadvantage is that when the MOSFET switch 12 is turned off and the diode 26 is forward biased by the voltage at this junction swinging below 0V, a current through the snubber inductor 20 circulates via the closed switch 12 and the forward biased diode 26, resulting in further losses.

Figure 2:
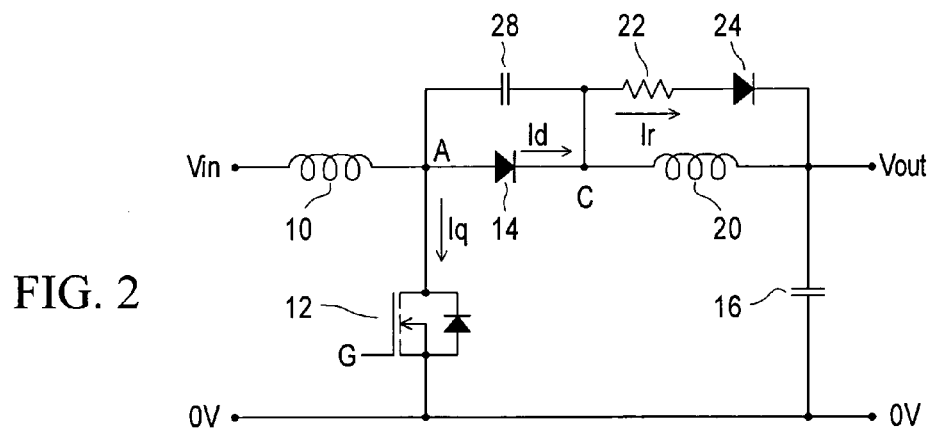
FIG. 2 schematically illustrates a boost converter in accordance with an embodiment of this invention.

FIG. 2 schematically illustrates a boost converter in accordance with an embodiment of this invention, including the same components 10, 12, 14, and 16 as described above for the boost converter of FIG. 1. Thus in the boost converter of FIG. 2 the inductor 10 and the diode 14 are coupled in series in a series path between the input and output terminals of the converter, and the MOSFET switch 12 is in a shunt path of the converter.

In addition, the boost converter of FIG. 2 includes a snubber comprising an inductor 20, resistor 22, and diode 24, which have the same references as in FIG. 1, and a capacitance 28. The snubber in the boost converter of FIG. 2 has no diode 26 as in the snubber of FIG. 1, and its components are connected differently as described further below.

More particularly, in the boost converter of FIG. 2 the inductor 20 is connected in series with the boost diode 14, in this case between the cathode of the diode 14 and the output terminal for the output voltage Vout of the converter. The inductor 20 typically has an inductance much less than that of the boost inductor 10. For ease of reference, junctions at the anode and cathode of the boost diode 14 of the converter of FIG. 2 are referenced A and C respectively, and the output terminal for the voltage Vout is referred to as the junction Vout.

The resistor 22 and diode 24 are connected in series between the junctions C and Vout, with the diode 24 poled for conducting a current Ir as shown through the resistor 22 in a direction from the junction C towards the junction Vout. The series order of the resistor 22 and the diode 24 can optionally be reversed from that shown. Thus either the diode 24 can have its cathode coupled to the junction Vout and its anode coupled via the resistor 22 to the junction C as shown, or the diode can have its anode coupled to the junction C and its cathode coupled via the resistor 22 to the junction Vout. In either case the series-connected resistor 22 and diode 24 are connected in parallel with the inductor 20, not in parallel with the series-connected inductor 20 and diode 14 as in the converter of FIG. 1.

The capacitance 28 is connected between the junctions A and C, and hence in parallel with the boost diode 14. Depending upon particular characteristics of the boost converter, including for example its switching frequency and output voltage, the capacitance 28 can be constituted partly or entirely by parasitic capacitance of the boost diode 14.

Figure 3:
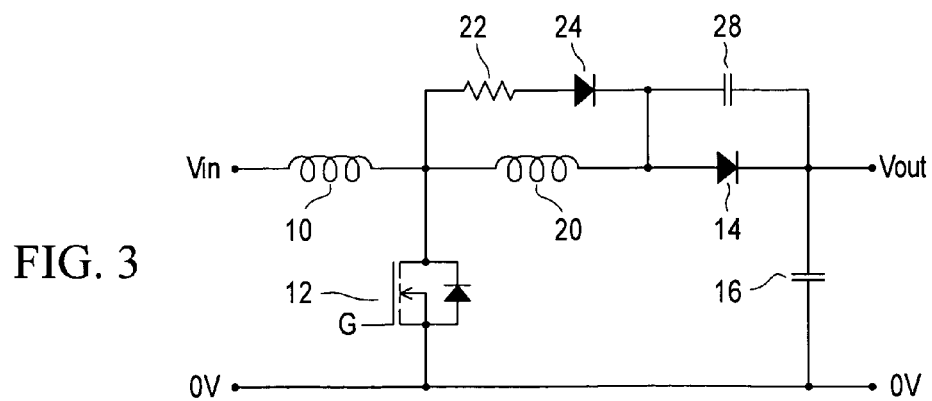
FIG. 3 schematically illustrates a modified form of the boost converter of FIG. 2 in accordance with another embodiment of this invention.

FIG. 3 shows a modified form of the boost converter of FIG. 2, in which the series order of the boost diode 14 and the inductor 20 is changed. Thus in the converter of FIG. 3 one terminal of the inductor 20 is connected to the junction between the drain of the MOSFET switch 12 and the inductor 10, and the other terminal of the inductor 20 is connected to the anode of the boost diode 14. The cathode of the boost diode 14 is connected to the output terminal for the output voltage Vout. As in the converter of FIG. 2, in the converter of FIG. 3 the series-connected resistor 22 and diode 24 (in either order) are in parallel with the inductor 20, and the capacitance 28 is in parallel with the boost diode 14.

Operation of the converter of FIG. 3 is similar to operation of the converter of FIG. 2, which is described below with additional reference to FIGS. 4 to 6, which illustrate waveforms of voltages and currents that can occur in operation of the converter. These waveforms are simplified in that the effects of parasitics are not all shown.

Figure 6:
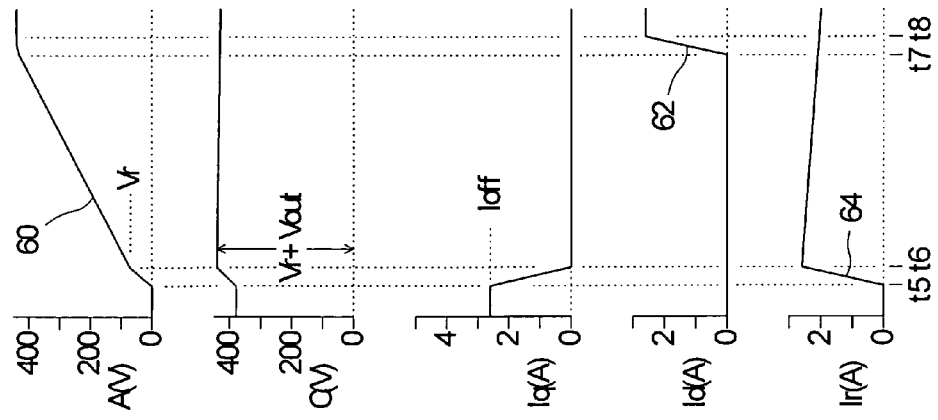
FIG. 6 illustrates the simplified waveforms of FIG. 4 on an expanded time scale, around a switch turn-off time of the boost converter.
Figure 5:
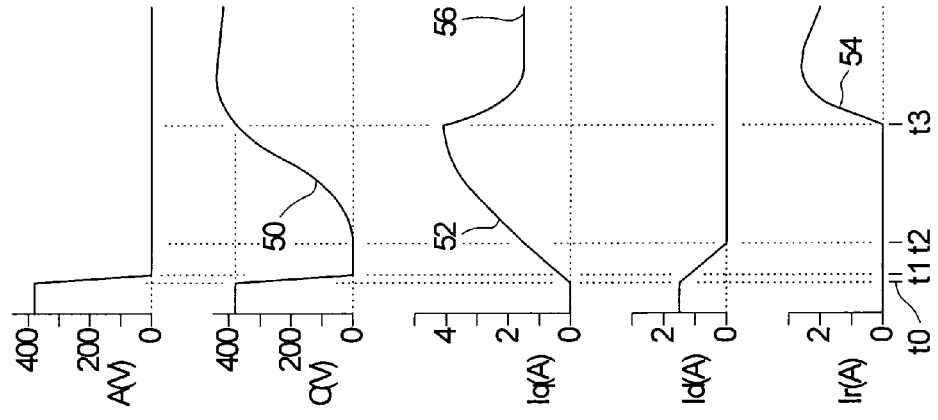
FIG. 5 illustrates the simplified waveforms of FIG. 4 on an expanded time scale, around a switch turn-on time of the boost converter.
Figure 4:
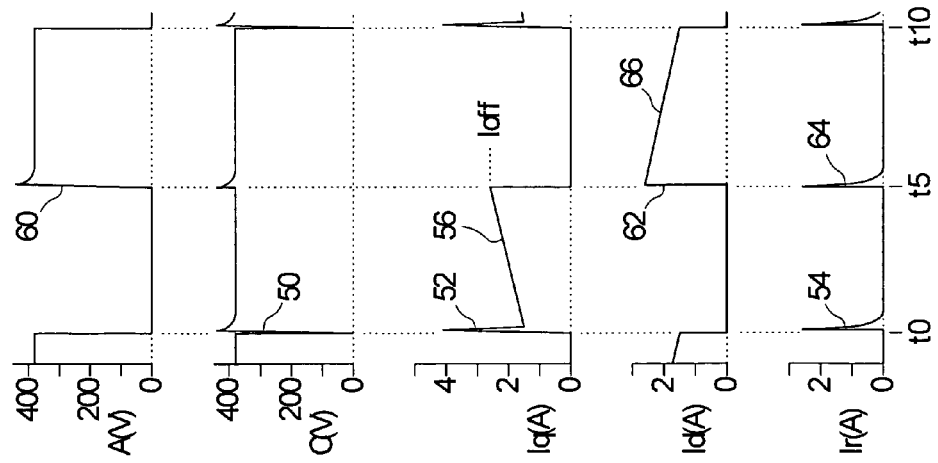
FIG. 4 illustrates simplified waveforms of voltages and currents that can occur in operation of the boost converter of FIG. 2.

More particularly, each of FIGS. 4 to 6 illustrates voltage waveforms A and C, in volts (V), at the junctions A and C respectively in FIG. 2, and current waveforms Iq, Id, and Ir, in amps (A), for a current Iq in the switch 12 (drain-source current of the MOSFET constituting the switch 12), a current Id in the boost diode 14, and the current Ir in the resistor 22, as shown by arrows in FIG. 2. FIG. 4 illustrates the waveforms for a complete switching cycle, and FIGS. 5 and 6 illustrate the waveforms on expanded time scales around the turn-on and turn-off times, respectively, of the switch 12. For example, the period of one switching cycle from a time t0 to a time t10 in FIG. 4 can be 10 μs, the period from the time t0 to a time t3 in FIG. 5 can be of the order of about 80 ns, and the period from a time t5 to a time t8 in FIG. 6 can be of the order of about 50 ns.

These waveforms are described for a boost converter having the following component values and characteristics, which are given here by way of example to assist in providing a full understanding; the invention is not limited in any way to any of these values or characteristics:

| | | | |
|---|---|---|---|
| Output voltage Vout | 385 V | Inductor 20 | 5 µH |
| Switching frequency | 100 kHz | Resistor 22 | 25 Ω |
| Boost inductor 10 | 800 µH | Capacitance 28 | 300 pF |
| Output capacitor 16 | 50 µF | Output power | 400 W |

In other embodiments of the invention, all of these values may be completely different. As just one example, the capacitance 28 can be increased to several nF with a less hard drive of the MOSFET switch 12, or it can potentially be reduced to the parasitic capacitance of the boost diode 14 for a boost converter with a low output voltage.

Referring particularly to FIGS. 4 and 5, immediately before a time t0 at which the control signal G goes high to turn on the MOSFET constituting the switch 12, the diode 14 is forward biased to conduct the current Id from the input Vin to the output junction Vout via the inductors 10 and 20, the currents Iq and Ir are substantially zero, and the junctions A and C are at substantially the output voltage Vout (the junction A actually being more positive than the junction C by the forward voltage of the diode 14 at the prevailing current Id).

Starting at the time to when the control signal G (not shown) goes high, and until a time t1 very soon afterwards as shown in FIG. 5, the MOSFET turns on (the switch 12 is closed) so that the voltage at the junction A falls rapidly to substantially zero. Because of the inductor 20 in series with the diode 14, during the short interval t0-t1 the current Id in the diode 14 and inductor 20 changes very little, the diode 14 remains forward biased, and the voltage at the junction C also falls substantially to zero at the time t1.

Consequently, as shown in FIG. 5, in the interval t0-t1 the MOSFET switch 12 is turned on with very little current Iq flowing, and hence under almost zero current switching (ZCS) conditions with relatively little switching loss. At the time t1 the MOSFET switch 12 is fully turned on and the output voltage Vout appears across the inductor 20. Accordingly the current Id in the forward biased diode 14 and the inductor 20 ramps down, linearly from the time t1, to reach zero at a time t2 somewhat after the time t1 as shown in FIG. 5.

At the time t2 when the current Id reaches zero, the diode 14 becomes reverse biased and the voltage at the junction C rises from substantially zero in a resonant fashion, as best shown by a curve 50 in FIG. 5, due to the capacitance 28 being charged via the inductor 20. The resonance causes the voltage at the junction C to overshoot the output voltage Vout at a time t3, following which the diode 24 becomes forward biased and the current Ir rises from substantially zero as best shown by a curve 52 in FIG. 5, energy stored in the inductor 20 being dissipated in the resistor 22.

As shown in FIGS. 4 and 5 by a curve 52, from the time t0 until the time t2 the current Iq rises in an inverse manner to the fall of the current Id during this period, and from the time t2 until the time t3 the current Iq continues to rise with current flowing via the inductor 20 and the capacitance 28 as the voltage at the junction C rises resonantly as described above. When the diode 24 becomes forward biased starting at the time t3, the current Iq falls to a steady state value corresponding to its value at the time t2 and the value of the current Id at the time t0. During the remainder of the on period of the MOSFET switch 12, until the time t5 as best shown in FIG. 4 by a line 56, the current Iq in the MOSFET switch 12 ramps up from this steady state value to a value Ioff, due to the input voltage Vin applied to the boost inductor 10 by the closed switch 12.

Referring particularly to FIGS. 4 and 6, immediately before the time t5 at which the control signal G goes low to turn off the MOSFET switch 12, the junction A is at 0V and the junction C is at substantially the output voltage Vout, the capacitance 28 being charged to the output voltage Vout and the diode 14 being reverse biased, so that the currents Id and Ir are substantially zero. The MOSFET switch 12 is on, with its current Iq, conducted via the boost inductor 10, having the value Ioff as shown in FIGS. 4 and 6.

The MOSFET switch 12 is turned off (the switch 12 is opened) during an interval from the time t5, when the control signal G (not shown) goes low, until a time t6 at which the MOSFET is fully turned off. During this interval t5-t6 the current Iq of the MOSFET switch 12 falls from its value Ioff to substantially zero. As the current in the inductors 10 and 20 can not change instantaneously, the current in the inductor 10 flows via the capacitor 28, the resistor 22, and the diode 24 to the output junction Vout, with the voltage at the junction A rising rapidly to a value Vr=R.Ioff where R is the resistance of the resistor 22. The voltage at the junction C is increased correspondingly to a value Vr+Vout, thereby forward biasing the diode 24, and as shown by a line 64 the current Ir in the resistor 22 and the diode 24 increases to substantially the value Ioff at the time t6.

From the time t6 until a time t7, the capacitance 28 is discharged substantially linearly by the relatively constant current Ir flowing via the inductor 10, capacitance 28, resistor 22, and forward biased diode 24, so that the voltage at the junction A rises substantially linearly as best shown by a line 60 in FIG. 6. At the time t7 this voltage at the junction A rises above the voltage at the junction C and forward biases the diode 14, which accordingly starts to conduct, its current Id rising, as best shown by a line 62 in FIG. 6, from the time t6 until a time t7 at which the diode 14 conducts all of the current flowing via the inductor 10.

Following the time t8, as shown in FIG. 4 the voltages at the junctions A and C fall to substantially the output voltage Vout, the current Ir falls to substantially zero, and the current Id flowing through the inductor 10, diode 14, and (when the current Ir has fallen to substantially zero) the inductor 20 ramps down, as shown by a line 66 in FIG. 4, until the time t10 at which the switching cycle repeats. At the time t10 the current Id reaches substantially the same value as at the time t0.

The resistance R of the resistor 22 and the magnitude of the capacitance 28 are desirably chosen so that the voltage Vr which is attained by the junction A while the MOSFET switch 12 is turning off is a small fraction of the output voltage Vout; for example as illustrated in FIG. 6 it may be of the order of 60V or less for an output voltage Vout of the order of 385V. Consequently, switching losses on turning off the MOSFET switch 12 are greatly reduced. For example, turn-off switching losses for the converter of FIG. 2 may be of the order of 15% or less of the switching losses for the same converter without a snubber.

In addition, by choosing the inductance of the inductor 20 to be sufficient that the interval t0-t2 is substantially larger than the interval t0-t1 for turn-on of the MOSFET switch 12, the switching loss on turn-on of the MOSFET switch 12 is reduced as described above, for example to 20% or less of what it would be for the same converter without a snubber. Further, because the forward bias of the diode 14 in the converter of FIG. 2 is maintained until after the MOSFET switch has been fully turned on, the problem of diode reverse recovery is avoided.

Thus while the converter of FIG. 2 still has some losses, these are greatly reduced in comparison to the losses of a converter without a snubber. Power dissipation in the resistor 24 can for example be of the order of 1% of the output power of the converter. At the same time, the diode reverse recovery problem is avoided, so that the converter of FIG. 2 does not require the use of very fast or very expensive diodes. These advantages of the converter of FIG. 2 are achieved without requiring an additional switch and its drive circuitry, and without the relative complexity and related costs, of soft switching boost converters as discussed above. They are also achieved without requiring the further diode 26 as in the converter of FIG. 1, and without any consequent circulating current through such a diode.

Although the above description relates to a boost converter, similar issues of switching losses and diode reverse recovery arise in other power converters, including for example a buck converter, and can be addressed in accordance with embodiments of the invention in a similar manner to that described above. For example, FIG. 7 illustrates a buck converter in accordance with another embodiment of the invention.

Figure 7:
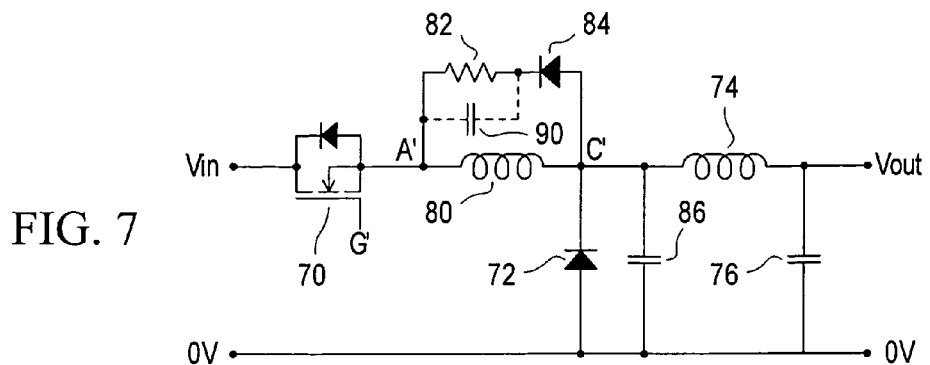
FIG. 7 schematically illustrates a buck converter in accordance with an embodiment of this invention.

Referring to FIG. 7, the buck converter shown therein comprises a MOSFET switch 70, controlled by a control signal G' supplied to its gate, coupled in series with an output inductor 74 between a terminal for a positive input voltage Vin and a terminal for a positive output voltage Vout which is less than Vin. The buck converter also includes a diode 72 having its anode connected to a 0V line and its cathode coupled to a point between the MOSFET switch 70 and the output inductor 74, and an output capacitor 76 coupled between the positive output voltage terminal and the 0V line. Thus in the buck converter of FIG. 7 the MOSFET switch 70 and the inductor 74 are coupled in series in a series path between the input and output terminals of the converter. The diode 72 is connected in a shunt path of the converter.

The buck converter of FIG. 7 also includes a snubber comprising an inductor 80, in series between the MOSFET switch 70 and the output inductor 74; a series-connected resistor 82 and diode 84, in parallel with the inductor 80 with the diode 84 poled for conduction in the same direction as the body diode of the MOSFET switch 70; and a capacitance 86 in parallel with the diode 72. The inductor 80 typically has a much smaller inductance than the output inductor 74. With a relatively lower output voltage, the capacitance 86 may typically be larger than the capacitance 28 in the boost converter of FIG. 2, and the resistance of the resistor 82 may typically be smaller than that of the resistor 22 of the boost converter of FIG. 2.

FIG. 7 also shows a junction A' of the source of the MOSFET switch 70 with the inductor 80, and a junction C' of the cathode of the diode 72 with the inductors 80 and 74, which are referred to below. The buck converter of FIG. 7 operates in a manner that can be correlated to the operation of the boost converter of FIG. 2 as described in detail above, and is summarized below.

Immediately before the MOSFET switch 70 is turned on, the junctions A' and C' are at substantially 0V, and there is substantially zero current through the MOSFET switch 70 and the resistor 82. The diode 72 is forward biased and conducting current via the inductor 74 to the capacitor 76 and the output. Under the control of the control signal G', the MOSFET switch 70 is turned on rapidly and the voltage at the junction A' rises quickly to the input voltage Vin, with the diode 72 still forward biased and its current ramping down relatively slowly to zero, current through the MOSFET switch 70 increasing conversely. The voltage at the junction C' then rises resonantly due to the capacitance 86 and inductance 80, with current through the MOSFET switch 70 rising, until the diode 84 becomes forward biased. Then energy of the inductor 80 is dissipated in the resistor 82. The current through the MOSFET switch 70 accordingly falls to a steady state from which it ramps up slowly until the MOSFET switch is turned off. While the current through the MOSFET switch 70 is ramping up, the voltage at the junction C' falls to the input voltage Vin.

When the control signal G' turns off the MOSFET switch 70, current through the inductor 80 flows via the diode 84 and resistor 82 instead of through the switch. Consequently the switch current falls rapidly to zero and the voltage at the junction A' falls rapidly by the product of this current and the resistance of the resistor 82. The voltages at the junctions A' and C' then fall relatively slowly, until the voltage at the junction A' has become negative and the voltage at the junction C' crosses zero and forward biases the diode 72. Current then flows via the diode 72 and the output inductor 74, ramping down slowly until the MOSFET switch 70 is next turned on, with the voltages at the junctions A' and C' returning to substantially 0V and the current through the resistor 82 falling to zero.

As the MOSFET switch 70 is directly in series with the inductor 80 with its parallel series-connected resistor 82 and diode 84, it will be appreciated that the positions of these can be exchanged; thus the inductor 80 with its parallel series-connected resistor 82 and diode 84 can instead be connected between the terminal for the input voltage Vin and the MOSFET switch 70. In either case the inductor 80 is in series with the MOSFET switch 70, in the series path between the input and output terminals of the converter.

Figure 8:
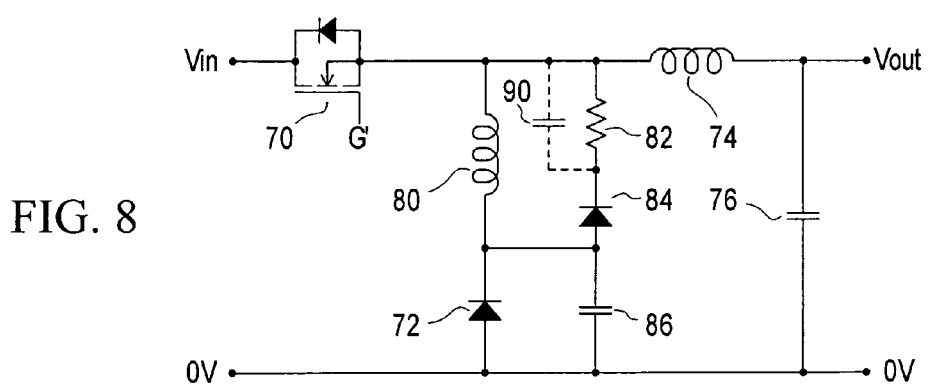
FIG. 8 schematically illustrates another buck converter in accordance with a further embodiment of this invention.

Another alternative circuit arrangement of the buck converter is illustrated in FIG. 8, in which, instead of being connected in series with the MOSFET switch 70 as in FIG. 7, the inductor 80 and its parallel series-connected resistor 82 and diode 84 are connected in series with the diode 72 and its parallel capacitance 86, i.e. in the shunt path of the converter. Thus as shown in FIG. 8, the inductor 80, and likewise the series-connected resistor 82 and diode 84, are connected between the cathode of the diode 72 and the junction of the MOSFET switch 70 with the output inductor 74.

Alternatively, the cathode of the diode 72 can be connected to the junction of the MOSFET switch 70 and the output inductor 74, and the inductor 80 can be connected between the anode of the diode 72 and the 0V line, with the capacitance 86 in parallel with the diode 72 and the series-connected resistor 82 and diode 84 in parallel with the inductor 80.

It can be appreciated that in each of the power converters of FIGS. 2, 3, 7, and 8, and the alternatives discussed above, the snubber inductor 20 or 80 is arranged so that it is in a series path which includes both the converter switch 12 or 70 and the converter diode 14 or 72. The inductor 20 or 80 prevents a very rapid change of current through the converter diode 14 or 72 when the MOSFET switch 12 or 70 is turned on, so that the diode remains forward biased until after the MOSFET switch is fully turned on. In addition, in each of these power converters and the alternatives discussed above, the series-connected resistor 22 or 82 and diode 24 or 84 are connected in parallel with the snubber inductor 20 or 80, and the capacitance 28 or 86, to the extent that it is not provided by the capacitance of the converter diode 14 or 72, is added in parallel with this diode. The invention also applies to other circuit arrangements, in buck or boost converters, other power converters, or other circuits such as may be used for motor control, relay control, and so on, that have similar relevant characteristics.

Figure 9:
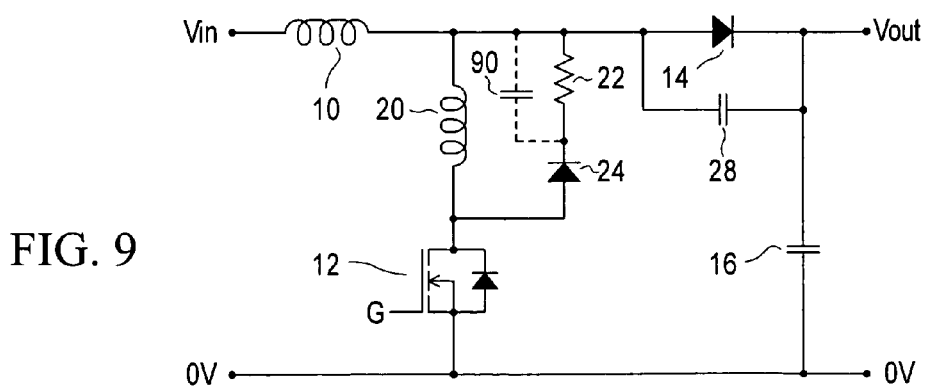
FIG. 9 schematically illustrates another boost converter in accordance with an embodiment of the invention.

From this, it can be seen for example that other embodiments of the invention can apply to a boost converter as shown in FIG. 9.

Referring to FIG. 9, in which the same components as in the boost converter of FIGS. 2 and 3 are used and have the same references, the inductor 20, and the series-connected resistor 22 and diode 24 in parallel with the inductor 20, are moved to a different position in the path that includes the converter MOSFET switch 20 and the boost diode 14, in this case in the shunt path of the converter, between the drain of the MOSFET switch 12 and the junction of the inductor 10 with the diode 14. The capacitance 28 is still connected in parallel with the diode 14.

It can be seen that the boost converter of FIG. 9 can be further modified by interchanging the positions, in the shunt path of the converter, of the MOSFET switch 12 and the inductor 20, with the resistor 22 and diode 24 remaining in parallel with the inductor 20, and/or by interchanging the positions of the series-connected resistor 22 and diode 24.

It can further be appreciated that the snubber inductor 20 or 80, with the series-connected resistor 22 or 82 and diode 24 or 84 in parallel with the inductor 20 or 80, can instead be moved to a position in the 0V line, between the MOSFET switch 12 and the output capacitor 16 in the case of a boost converter, and between the 0V input terminal and the converter diode 72 in the case of a buck converter.

Figure 10:
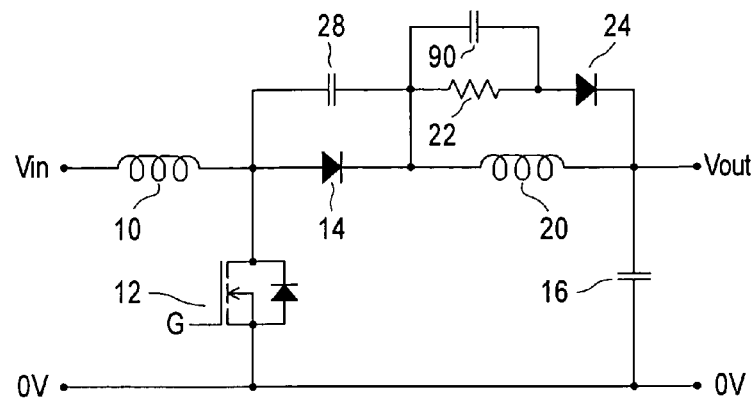
FIGS. 10 to 12 illustrate modifications of the boost converter of FIG. 2 in accordance with further embodiments of the invention.
Figure 11:
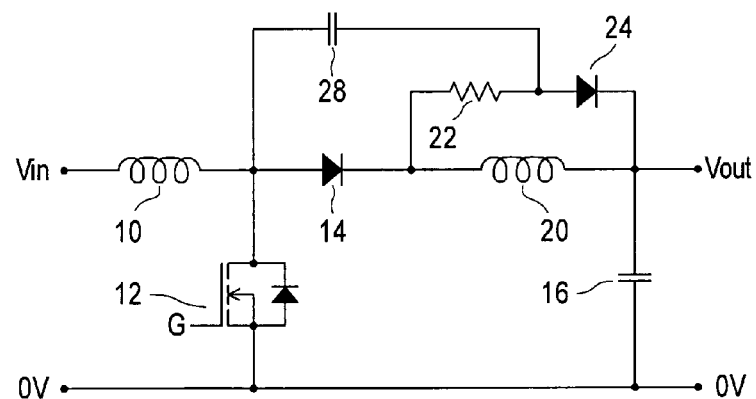
Figure 12:
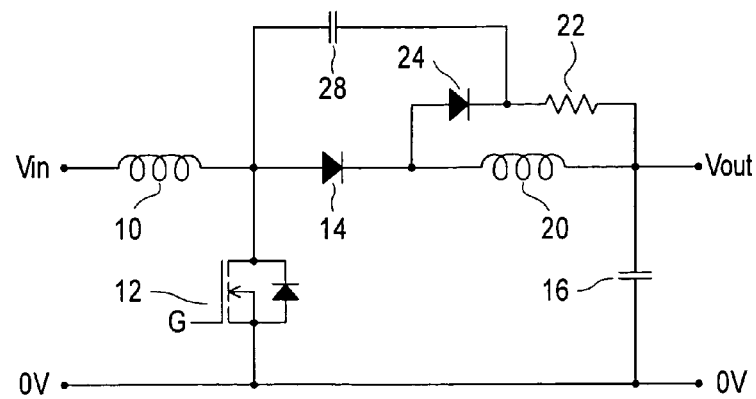

FIGS. 10 to 12 illustrate modifications of the boost converter of FIG. 2 in accordance with further embodiments of the invention. Similar modifications can be applied to the converters of FIG. 3 and FIGS. 7 to 9.

In FIG. 10, the boost converter of FIG. 2 is modified by providing an additional capacitor 90 in parallel with the resistor 22. The addition of the capacitor 90 has the advantages of reducing peak voltage across, and peak current through, the resistor 22. Current through the resistor 22 in this case flows for a longer time, so that there is no change in power dissipated by the resistor 22. This capacitor 90 in parallel with the resistor 22 is also shown in dashed lines in each of FIGS. 7 to 9 to indicate that it may optionally be provided in the power converters of these figures.

In FIG. 11, the boost converter of FIG. 10 is further modified by incorporating the capacitance of the capacitor 90 into the capacitor 28, which accordingly is connected between the anode of the diode 14 and the junction between the resistor 22 and the diode 24. The capacitor 28 is thus connected in parallel with the diode 14 and the resistor 22 in series. In FIG. 12, the series order of the resistor 22 and the diode 24 is reversed. The capacitor 28 is again connected between the anode of the diode 14 and the junction between the resistor 22 and the diode 24. Thus in this case the capacitor 28 is connected in parallel with the diode 14 and the diode 24 in series.

It can be appreciated that, in any instance where a terminal of the capacitor 28 or 90 is connected to a point at a substantially DC level, it can be connected instead to any other point at a substantially DC level. For example, in the boost converter of FIG. 3, instead of being connected between the anode of the diode 14 and the cathode of the diode 14 which is at the substantially DC output voltage Vout, the capacitor 28 can be coupled between the anode of the diode 14 and the 0V line. Applying this principle and the modification of FIG. 11 or FIG. 12 to the converter of FIG. 3, the capacitor 28 can instead be connected between the junction of the resistor 22 and the diode 24, in series in either the order shown in FIG. 3 or the reverse order, and either the cathode of the diode 14 at the substantially DC output voltage Vout or the 0V line, or the terminal for the voltage Vin if this is a DC input voltage.

Thus although particular embodiments of the invention are described above by way of example, it can be appreciated that numerous modifications, variations, and adaptations may be made without departing from the scope of the invention as defined in the claims.

The invention claimed is:

1. A power converter comprising two input terminals, two output terminals, an output capacitor coupled between the two output terminals, a first inductor in a series path between the input and output terminals, a switch controlled by a control signal, and a first diode, the converter having a configuration for producing an output voltage at the output terminals from an input voltage supplied to the input terminals, the converter further comprising a second inductor, a resistor connected in series with a second diode, the series-connected resistor and second diode being connected in parallel with the second inductor, the second inductor and the series-connected resistor and second diode in parallel therewith being in a path in series with the switch and the first diode, and a capacitor connected in parallel with the first diode, or in parallel with a series connection of the first diode and the second diode, or in parallel with a series connection of the first diode and the resistor.

2. A power converter as claimed in claim 1 wherein the first inductor and the switch are coupled in series between the two input terminals, and the first diode is in said series path between the input and output terminals, to provide a boost configuration of the power converter.

3. A power converter as claimed in claim 2 wherein the second inductor is in series with the first diode in said series path between the input and output terminals.

4. A power converter as claimed in claim 2 wherein the second inductor is in series with the switch in a shunt path of the converter.

5. A power converter as claimed in claim 1 wherein the first inductor and the first diode are coupled in series between the two output terminals, and the switch is in said series path between the input and output terminals, to provide a buck configuration of the power converter.

6. A power converter as claimed in claim 5 wherein the second inductor is in series with the switch in said series path between the input and output terminals.

7. A power converter as claimed in claim 5 wherein the second inductor is in series with the first diode in a shunt path of the converter.

8. A boost converter comprising two input terminals, a first inductor and a controlled switch coupled in series between the two input terminals, a first diode and an output capacitor coupled in series across the switch, a second inductor, a resistor connected in series with a second diode, the series-connected resistor and second diode being connected in parallel with the second inductor, the second inductor and the series-connected resistor and second diode in parallel therewith being in series with the first diode, and a capacitor connected in parallel with the first diode, or in parallel with a series connection of the first diode and the second diode, or in parallel with a series connection of the first diode and the resistor.

9. A boost converter as claimed in claim 8, wherein the capacitor is connected in parallel with the first diode, and wherein the converter further comprises a further capacitor coupled in parallel with the resistor.

10. A boost converter comprising two input terminals, a first inductor and a controlled switch coupled in series between the two input terminals, a first diode and an output capacitor coupled in series across the switch, a second inductor, and a resistor connected in series with a second diode, the series-connected resistor and second diode being connected in parallel with the second inductor, the second inductor and the series-connected resistor and second diode in parallel therewith being in series with the switch, the converter further comprising a capacitor connected in parallel with the first diode, or in parallel with a series connection of the first diode and the second diode, or in parallel with a series connection of the first diode and the resistor.

11. A boost converter as claimed in claim 10, wherein the capacitor is connected in parallel with the first diode and wherein the converter further comprises a further capacitor coupled in parallel with the resistor.

12. A circuit arrangement comprising:
- a first inductor through which a current flows in operation of the circuit arrangement;
- a switch arranged to be opened and closed under the control of a control signal, the switch being arranged for conducting current of the first inductor when the switch is closed; and
- a first diode arranged to be forward biased for conducting current of the inductor when the switch is open and for being reverse biased when the switch is closed;

wherein the circuit arrangement further comprises:
- a second inductor, having an inductance much less than an inductance of the first inductor;
- a resistor connected in series with a second diode, the series-connected resistor and second diode being connected in parallel with the second inductor, the second inductor with the series-connected resistor and second diode in parallel therewith being in a path in series with the switch and the first diode; and
- a capacitor connected in parallel with the first diode, or in parallel with a series connection of the first diode and the second diode, or in parallel with a series connection of the first diode and the resistor.

13. A circuit arrangement as claimed in claim 12 and forming a boost converter having input and output terminals, the first inductor coupling the input terminals to the switch, and the first diode coupling a junction between the first inductor and the switch to the output terminals.

14. A circuit arrangement as claimed in claim 12 and forming a buck converter having input and output terminals, the first inductor coupling the output terminals to the first diode, and the switch coupling a junction between the first inductor and the first diode to the input terminals.

* * * * *